United States Patent [19]

Lyons et al.

[11] Patent Number: 5,552,882
[45] Date of Patent: Sep. 3, 1996

[54] METHODS OF AND APPARATUS FOR CALIBRATING PRECISELY SPACED MULTIPLE TRANSVERSE HOLOGRAPHIC GRATINGS IN OPTICAL FIBERS

[76] Inventors: Donald R. Lyons, 100 Richmond Run, Yorktown, Va. 23693; Zolili U. Ndlela, 8528 Annette Engle Way, Fair Oaks, Calif. 95628

[21] Appl. No.: 413,979

[22] Filed: Mar. 28, 1995

[51] Int. Cl.⁶ .......................... G01N 21/84; G01B 9/021; G02B 6/34
[52] U.S. Cl. ................ 356/73.1; 359/34; 359/35
[58] Field of Search ............................ 356/73.1; 359/34, 359/35; 385/37

[56] References Cited

U.S. PATENT DOCUMENTS

| | | | |
|---|---|---|---|
| 4,560,249 | 12/1985 | Nishiwaki et al. | |
| 4,673,241 | 6/1987 | Nishiwaki et al. | |
| 5,098,804 | 3/1992 | Booth | 430/1 |
| 5,121,231 | 6/1992 | Jenkins et al. | 359/7 |
| 5,307,437 | 4/1994 | Facq et al. | 385/124 |
| 5,315,436 | 5/1994 | Lowenhar et al. | 359/569 |
| 5,319,435 | 6/1994 | Melle et al. | 356/32 |
| 5,388,173 | 2/1995 | Glenn | 359/34 X |

Primary Examiner—Vincent P. McGraw
Attorney, Agent, or Firm—Millen, White, Zelano, & Branigan, P.C.

[57] ABSTRACT

A Bragg reflection filter wavemeter is used to measure transverse holographic gratings and optical fibers and utilizes a first interferometer which is always fixed with respect to the optical fiber and a second adjustable interferometer. The optical fiber and first interferometer are mounted on a translating support while the second interferometer includes a pair of angularly adjustable mirrors for changing the angle at which the object and reference beams thereof intersect the fiber. Since the fiber is mounted on a movable support, the position of the support can be continually adjustable so that the reference and object beams always intersect the fiber at the same point, regardless of the angle assumed by the reflecting mirrors. The resulting interference patterns are projected by an objective lens to the far field in which a linear scanning, photodiode array is moved. The photodiode array includes a first photodiode which is sensitive only to the interference patterns from the first laser beam and a second photodiode sensitive to the interference patterns from the second laser beam. The photodiodes are connected to a counter which provides ratios of interference line counts which are then multiplied by wavelength to provide precise modulation spacings so as to establish wavelength standards.

21 Claims, 2 Drawing Sheets

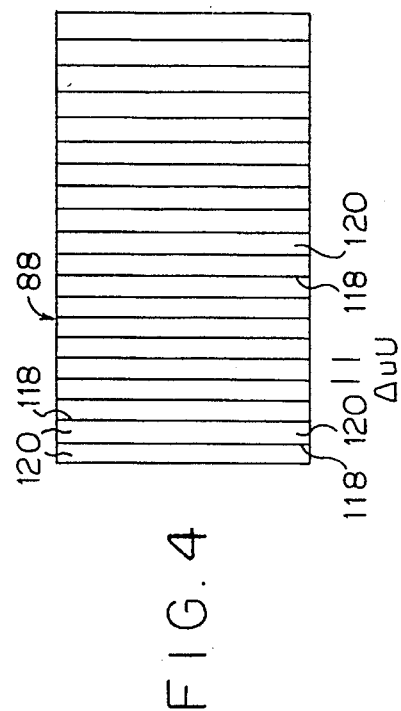
FIG. 2
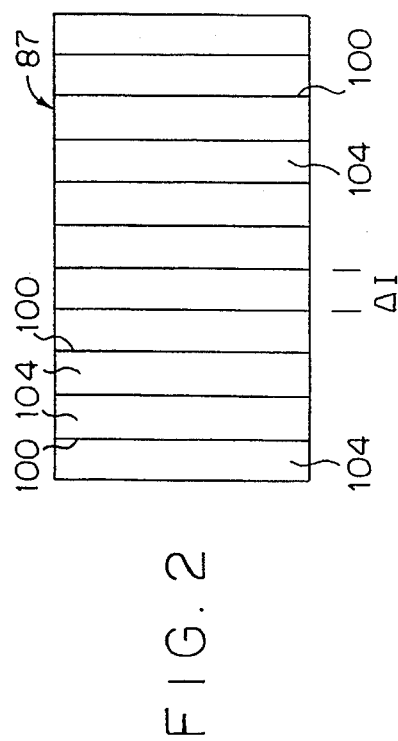
FIG. 4
FIG. 3
FIG. 5
FIG. 6

METHODS OF AND APPARATUS FOR CALIBRATING PRECISELY SPACED MULTIPLE TRANSVERSE HOLOGRAPHIC GRATINGS IN OPTICAL FIBERS

FIELD OF THE INVENTION

The present invention relates to methods of and apparatus for calibrating and writing multiple transverse holographic gratings in optical fibers. More particularly, the present invention relates to methods of and apparatus for determining the precise modulation spacing of transverse holographic gratings in optical fibers to provide standardized wavelength markers where high volume, high definition wavelength division multiplexing is applicable.

BACKGROUND OF THE INVENTION

Wavelength discriminators are incorporated in optical fibers by writing transverse holographic gratings into the fibers with a UV laser which sets up interference patterns within germanium-doped light guiding regions of the fibers. Such discriminators are employed in patents such as U.S. Pat. Nos. 5,048,913; 5,191,458; and 5,307,437 incorporated herein by reference. Wavelength discriminators have numerous applications and are used in such varied technologies as telecommunications, aerospace and medical devices.

To date, no wavelength standard has been established to provide precise modulation spacing of these transverse holographic gratings. The only high precision method to determine the resonant wavelengths is to monitor the final reflective wavelength response function. A major consequence of this lack of standardization and the resulting lack of precision in the spacing of Bragg reflection filters is an inability to set light probes and optical sensors at the proper wavelength regions to provide maximum photonic response for devices which operate within the transmission spectrum of optical fibers. Since there is no known wavelength standard, the writing locations for Bragg regions cannot be instantly or automatically calibrated. Accordingly, wavelength division multiplexed devices used to send and receive signals, cannot be set at appropriate spectral positions, or in optical location.

SUMMARY OF THE INVENTION

The present invention is directed to a method of calibrating a wavelength standard to determine precise modulation spacing of transverse holographic gratings in optical fibers. The method contemplates an improvement comprising writing a single hologram in a region of space in the optical fiber and producing two overlapping interference patterns in the region of space. The Bragg wavelength corresponding to one of the interference patterns is then uniquely determined by illuminating the optical fiber with a longitudinally applied laser beam.

In a more specific aspect, the present method relates to a method of calibrating a wavelength standard to determine the precise modulation spacing of transverse holographic gratings in optical fibers. In accordance with the method, a single hologram is written in the optical fiber located at the image plane of a microscope objective. Two separate interferometers, each using a laser of different wavelength, are employed to produce two interference patterns in the same region of space. The first interferometer (preferably Vis/IR) produces a first fringe pattern which is applied obliquely to the fiber. The second interferometer (preferably UV) produces a single hologram and a second fringe pattern to overlap the first fringe pattern. When the optical fiber is illuminated and probed with a longitudinally applied tunable continuous wave laser, the first Bragg wavelength corresponding to the preferred UV interference pattern is uniquely determined.

In a further aspect of the method, the number of lines in the first fringe pattern are compared to the number of lines in the second fringe pattern to provide an initial ratio of fringe lines. This ratio is multiplied by the Bragg wavelength of the longitudinally applied probe laser beam to obtain the wavelength spacing of the first (Vis/IR) interference fringe pattern, which completes the calibration stage for the first interferometer.

The method further includes the step of determining the second fringe patterns for arbitrary second fringe spacings by multiplying the inverse of the initial ratio by the actual Bragg wavelength of the first laser beam, which completes the calibration stage for the second interferometer. All power and wavelength dependent factors are determined empirically for a given range of writing power and exposure times from the continuous probe laser response and are contained in the first Bragg wavelength.

The present invention is also directed to an apparatus for measuring transverse, holographic, optical fiber gratings in an optical fiber wherein the optical fiber is probed by a longitudinal laser beam. The apparatus contemplates an improvement comprising a support for mounting both the optical fiber and a first interferometer directing a first laser beam obliquely into the optical fiber to produce a first interference pattern and a second interferometer directing a second laser beam obliquely into the optical fiber to produce a second interference pattern, the second interferometer being adjustable with respect to the optical fiber. A comparator which compares the interference patterns generated by the first and second interferometers calibrates the gratings.

The apparatus for practicing the afore-described method comprises a moveable support which is mounted for translation in a longitudinal direction. The moveable support has mounted thereon, an optical fiber for movement in a direction transverse to the longitudinal direction as well as a vertical offset mechanism; a first laser for generating a first laser beam of a first wavelength mounted on the moveable support, and a first interferometer for splitting and impinging the first laser beam on the optical fiber. A second laser for generating a second laser beam of a second wavelength is fixed so that the moveable support translates with respect thereto. A second interferometer, not mounted on the moveable support, splits and directs the second laser beam onto the fiber optic cable. The oblique angles at which illuminating and reference beams produced by the second interferometer overlap in the slab is variable by simultaneously translating the slab and angularly adjusting the mirrors of the second interferometer. The interference pattern resulting from impingement by the first and second laser beams overlap in space and are projected by a lens on the moveable support to a far field in which a linear scanning, photodiode array is translated. The photodiode array includes a first photodiode sensitive to the wavelength of the first beam and a second photodiode sensitive to the wavelength of the second beam. A frequency counter which provides a ratio of the two fringe counts is connected to the photodiode array for producing a ratio of first wavelength counts to second wavelength counts, which ratio is multiplied by the second wavelength to determine the actual first wavelength (Vis/IR) spacing for the interference pattern. The actual wavelength (Vis/IR) is then multiplied by the ratio of the number of counts for the second wavelength to the number of counts for the first wavelength to measure second wavelength (UV) patterns for arbitrary second fringe pattern spacings.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is an enlarged view of a first interference pattern illustrating the spacing of first interference lines detected by the photodiode of FIG. 1;

FIG. 3 is a graphical depiction of spaced amplitude spikes corresponding to the interference line of the interference pattern of FIG. 2;

FIG. 4 is an enlarged view of a second interference pattern illustrating the spacing of second interference lines detected by the photodiode of FIG. 1;

FIG. 5 is a graph illustrating amplitude spikes having the spacing of the interference lines of FIG. 4; and FIG. 6 is a top schematic view of apparatus for writing a first holograph in an optical fiber and for initially calibrating the fiber.

DETAILED DESCRIPTION

Figure 1:
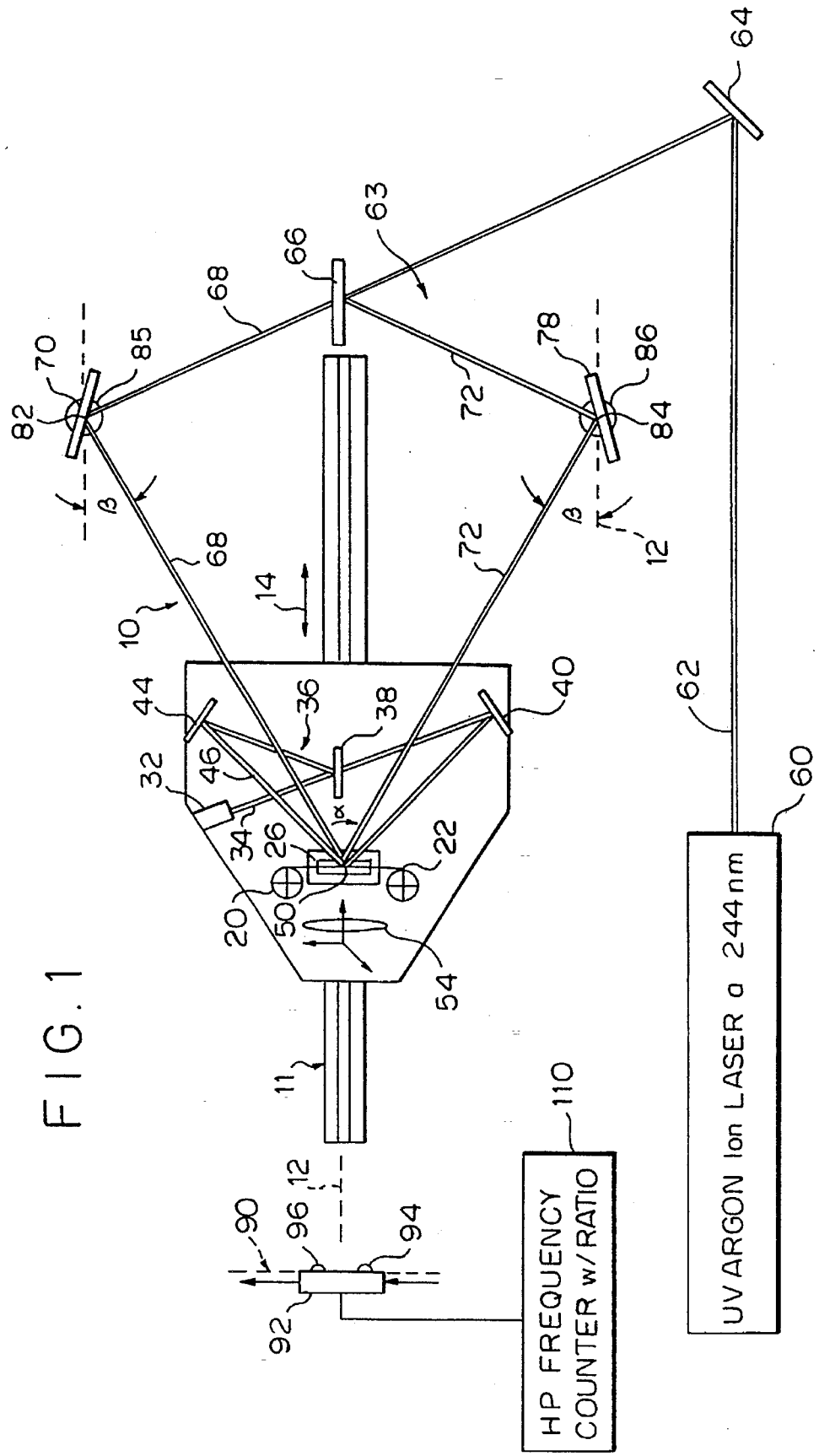
FIG. 1 is a top, schematic view of apparatus configured in accordance with the principles of the instant invention for performing the methods of the instant invention.

Referring now to FIG. 1, there is shown an apparatus 10 configured in accordance with the principles of the present invention to perform the methods of the present invention. The apparatus 10 comprises a rail 11 extending in the direction of a longitudinal axis 12 upon which is mounted a support 13 which translates on the rail in the direction of axis as illustrated by arrows 14. The support 13 is preferably a support known as a "Super-Invar Slab" which is minimally effected by changes in temperature and can therefore allow high stability and accuracy to its resident interferometer as it is longitudinally positioned on the rail 11.

Mounted on the support 13 is an optical fiber 20 which is fed from a first spool 22 and accumulated on a second spool 24. As the fiber is advanced, it is stabilized by a vacuum chuck 26. Also fixed to the moveable support 13 is preferable either an infrared or visible Vis/IR diode laser 32, which generates a first laser beam 34 through a 2 X beam expander. The first laser beam 34 is directed through a first interferometer 36 comprised of a beam splitter 38 fixed on the support 13, a first 100% reflective mirror 40 for reflecting a primary reference beam 42 and a second 100% reflective mirror 44 for reflecting a secondary reference beam 46. The beams 42 and 46 impinge at a location 50 on the optical fiber 20. It is emphasized that the mirrors 40 and 44 of the first interferometer 36, as well as a beam splitter 30 are fixed on the support 13.

Also mounted on the support 13, is an objective lens 54, which is mounted on the support 13 to move therewith and is adjustable in three directions for focusing ultraviolet light. The objective lens 54 is a UV Microscope objective.

An ultraviolet laser 60, is fixed with respect to the rail 11 and generates a second laser beam 62. The second laser beam is reflected by a first mirror 64 into a beam splitter 66, which transmits a second object beam 68 to a 100% reflective mirror 70. The mirror 70 directs the object beam 68 to the area 50 at which the object and reference beams 42 and 46 of the first laser beam 34 are directed. The reflected portion of the second beam 62 forms a second reference beam 72, which is reflected from a 100% reflective mirror 78 to the location 50 on the optic fiber 20.

The oblique angle α which the object and reference beams 68 and 72 of the second laser beam 62 make with the optical fiber 20 is adjustable by adjusting the angle β of the mirrors 70 and 78 that the mirrors make with the direction of the longitudinal axis 12 on rail 11. The mirrors 70 and 78 are rotated about vertical axes 82 and 84 by synchros 85 and 86 through very precise computer controlled angular increments to change the angle D and thus the angle α. As the mirrors 70 and 78 are angularly changed, the support 13 is slid in the direction of arrow 14 along with axis 12 so that the point of interception of the second object and reference beams 68 and 72 remains at the area 50 of the fiber optic 20, The angle of B that the object and reference beam 42 and 46 of the first laser beam 34 make with the fiber optic 20 remains constant as the angle α changes. As a consequence, when the support 13 is translated on the rail 11, a first interference pattern 87 (FIG. 2) created by the visible or infrared laser 32 with the beam 34 remains unchanged while a second interference pattern 88 (FIG. 4) created by the ultraviolet laser 60 with the beam 62 changes its spacing.

These patterns are focused by the UV microscope objective 54 into a far field 90, where they are sampled by a double diode array 92 comprised of a first photodiode 94, which is sensitive only to first interference patterns 87 (FIG. 2) created by the first laser beam 34 and a second photodiode 96, which is sensitive only to the second interference patterns 88 (FIG. 4) created by the second laser beam 62 generated by the ultraviolet laser 60.

Referring now to FIGS. 2–4 in combination with FIG. 1, the output of the diode 94 produces the interference lines 100 of the interference pattern 87 shown in FIG. 2. The interference lines 100 have equal spacings 104 which are processed by a high pass frequency counter 110 (FIG. 1). The frequency counter 110 produces the series of spikes 112 shown in FIG. 3. Likewise, as seen in FIG. 4, the second interference pattern 88 is comprised of a series of interference lines 118, which are spaced equal distances 120 apart. The interference lines 118 are also processed by the frequency counter 110 (FIG. 1) to produce a series of spikes 122 shown in FIG. 5.

In accordance with the principles of the present invention the ratio of the ultraviolet spikes 118 to the reference spikes 112 is used to determine the interference pattern spacing for the second interferometer 63 by multiplying the ratio of the second count number 118 to the first count number 112 by the actual wavelength spacing for the first interference pattern created by the visible or infrared diode laser 32 with the first beam 34.

Referring now to FIG. 6, in order to obtain the actual wavelength spacing for the first interference pattern 87 created by the Vis/IR diode laser 32 of the first beam 34, a germanium-doped light guiding region 130 of the fiber 20 is illuminated to form a first hologram 132(1) by using a UV laser 60 and the first interferometer 63. The first beam 62 is applied at a wavelength $\lambda_c$, which writes the single hologram 132 in the germanium-doped region 130. Simultaneously, the fixed interferometer 36 applies the first beam 34, which at the location 50 is overlapped in space with the ultraviolet beam, the second beam 62, that produce the wavelength $\lambda_c$. As is seen in FIG. 6, there are numerous holograms 132(1)–132(n) in the region 130. In a typical light guiding region 130 there could be 10,000 holograms in a 2 millimeter portion.

A tunable continuous wave laser 140 calibrated to one part in $10^6$ to $10^8$ then probes the fiber 20 with a beam 142 to illuminate the fiber to uniquely determine $\lambda_c$. The resulting fringe patterns 87 and 88 (FIGS. 2 and 4) are then projected into the far field 90 and the counts 112 and 118 of FIG. 3 and FIG. S respectively are taken for the VIS/IR diode 32 and the UV diode 60. Upon multiplying the resulting ratio of the infrared counts 112 to the ultraviolet Counts 118 by the wavelengths $\lambda_c$, the actual wavelength spacing $\lambda_{Vis/IR}$, (actual) is determined.

In other words, Vis-IR counts/UV counts x$\lambda_c$ (actual)= $\lambda_{Vis/IR}$ (actual), wherein the Vis/IR counts are the counts 112 and the UV counts are the counts 122. $\lambda_{Vis/IR}$ (actual) is the wavelength applied by the UV interferometer 36 and $\lambda_{Vis/IR}$ (actual) is the wavelength spacing for the Vis/IR interference pattern 87.

To reiterate, once the Vis/IR interference pattern has been calibrated and the optical fiber 50 remains relatively stationary, the interference pattern remains calibrated for all time and can thus be used to measure the UV laser patterns for arbitrary UV fringe spacings. In other words, $$\frac{UV \text{ Counts}/}{Vis/IR \text{ counts}} \times \lambda_{Vis/IR}, (\text{actual}) = \lambda_{UV}$$

wherein UV counts are the counts 122 of FIG. 5; Vis/IR Counts are the Counts 112 of FIG. 3, $\lambda_{Vis/IR}$ (actual) is the wavelength spacing for the Vis/IR interference pattern, and $\lambda_{UV}$ is the ultraviolet wavelength for arbitrary UV fringe spacings.

In summary, it is seen the Bragg wave meter of FIG. 1, which produces the wavelength standard in accordance with the principles of the present invention utilizes first and second interferometers 36 and 63 respectively. The first interferometer 36 is a visible or infrared interferometer, which when calibrated acts as a wavelength standard for the second interferometer 63, which is an ultraviolet interferometer. The interferometer 36 produces wavelength spacings 1 00 of the pattern 87, shown in FIG. 2, while the interferometer 63 produces the wavelength pattern 88 of FIG. 4. These interference patterns overlap in space and are projected in the far field 90 from the original location 50 in the optical fiber 20 so as to be detectable by the photodiodes 94 and 96 of the photodiode array 92 as the moveable support 13 is moved transversely with respect to the longitudinal axis 12 of rail 11. This results in the vertical fringes 112 of FIG. 2 and 118 of FIG. 4, giving rise to the two different fringe counts 112 and 122 of FIGS. 3 and 5. The voltage signals of FIGS. 3 and 5 are then fed into the high pass frequency counter 110 which provides ratios of the two sets of fringe counts. When the ratios are multiplied by the actual fringe spacing of the calibrated Vis/IR interferometer 36, the actual fringe spacing for the UV holographic pattern 88 placed in the optical fiber 20 is determined.

The standard established by the aforedescribed methods and apparatus enable one to calibrate optical fibers for use in devices such as for example the devices disclosed in U.S Pat. Nos. 5,048,913; 5,191,458 and 5,307,437, incorporated herein by reference.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A method of calibrating a wavelength standard to determine precise modulation spacing of transverse holographic gratings in optical fibers, the improvement comprising the steps of:

writing a single hologram in a region of space in the optical fiber;

producing two overlapping interference patterns in the region of space occupied by the single hologram; and uniquely determining the Bragg wavelength corresponding to one of the interference patterns by illuminating the optical fiber with a longitudinally applied laser beam.

2. The improvement of claim 1, wherein the Bragg wavelength is determined for an ultraviolet interference pattern.

3. The improvement of claim 2, wherein the other interference pattern is produced with a visible or infrared laser.

4. The improvement of claim 1, wherein the two interference patterns each have lines and wherein the step of uniquely determining Bragg wavelength includes the steps of determining an initial ratio of the lines of one interference pattern with respect to the other and multiplying the initial ratio by the wavelength of the longitudinally applied laser beam.

5. The improvement of claim I further including the steps of:

determining fringe patterns for arbitrary fringe spacings by multiplying an inverse of the initial ratio by the Bragg wavelength of a laser beam of one interferometer to calibrate the other interferometer.

6. A method of calibrating a wavelength standard to determine precise modulation spacing of transverse holographic gratings in an optical fiber, the method comprising the steps of:

employing a first interferometer to calibrate a second interferometer;

with the second interferometer, writing a single hologram in the optical fiber with a second laser beam at a second wavelength applied obliquely to the fiber to produce a hologram having a second fringe pattern when illuminated by the second laser beam;

with the first interferometer, applying a first laser beam of a first wavelength obliquely to the fiber to produce a first fringe pattern overlapping the single hologram;

counting lines in the first and second fringe patterns;

establishing an initial ratio of fringe lines in the second fringe pattern to fringe lines in the first fringe pattern;

multiplying the ratio by the wavelength of the first laser beam to obtain the actual wavelength spacing of the second laser beam which produces the second fringe pattern to thus calibrate the second interferometer.

7. The method of claim 6 further including the steps of measuring the first fringe patterns for arbitrary first fringe spacings by multiplying a subsequent ratio which is the inverse of the initial ratio by the actual wavelength of the second laser beam.

8. The method of claim 7, wherein the first laser beam is an infrared or visible beam and the second laser beam is an ultraviolet beam.

9. The method of claim 8, wherein the first laser beam is fixed with respect to the optical fiber and wherein the second laser beam and optical fiber are adjustable with respect to one another.

10. The method of claim 9, wherein the optical fiber is longitudinally movable in the direction of the optical fiber's axis with respect to the first and second interferometers.

11. The method of claim 6, wherein the first laser beam is an infrared or visible beam and the second laser beam is an ultraviolet beam.

12. The method of claim 11, wherein the first laser beam is fixed with respect to the optical fiber and wherein the second laser beam and optical fiber are adjustable with respect to one another.

13. The method of claim 12, wherein the optical fiber is longitudinally movable in the direction of the optical fiber's axis with respect to the first and second interferometers.

14. A method of determining precise modulation spacing of transverse holographic gratings in an optical fiber to provide a known laser standard for that fiber, the method comprising the steps of:

impinging a first laser beam of a first wavelength on the fiber at a first location to provide a first interference pattern;

impinging a second laser beam of a second wavelength on the fiber at the first location to provide a second interference pattern which overlaps the first interference pattern;

projecting the interference pattern in a selected direction to a far field and into first and second photodiodes, the first photodiode being sensitive only the wavelength of the first laser beam and the second photodiode being sensitive only to the wavelength of the second laser beam;

moving the photodiodes transversely with respect to the selected direction to provide first and second sets of fringe counts corresponding to the first and second wavelengths;

establishing a ratio of second fringe counts to first fringe counts; and multiplying the ratio by the actual fringe spacing of the first interferometer to obtain the actual fringe spacing for the holographic pattern in the optical fiber.

15. In an apparatus for measurement of transverse, holographic, optical fiber gratings in an optical fiber wherein the optical fiber is probed by a longitudinal laser beam, the improvement comprising:

a support for mounting both the optical fiber and a first interferometer directing a first laser beam obliquely into the optical fiber to produce a first interference pattern;

a second interferometer directing a second laser beam obliquely into the optical fiber to produce a second interference pattern; the second interferometer being adjustable with respect to the optical fiber; and a comparator for comparing the interference patterns generated by the first and second interferometers to calibrate the gratings.

16. The improvement of claim 15, wherein the second interferometer has adjustable components which are disposed in spaced relation to the support and wherein the support selectively moves both the optical fiber and first interferometer with respect to the second interferometer.

17. The improvement of claim 16, wherein the optical fiber is mounted for longitudinal translation with respect to the support and to the first and second laser beams.

18. The improvement of claim 15, wherein the comparator comprises a pair of photodiodes upon which the interference patterns are focused, a frequency counter and a ratio output.

19. A Bragg reflection filter wavemeter for measurement of transverse holographic optical fiber gratings comprising:

a rail extending in the direction of a longitudinal axis;

a support mounted for translation on the rail in the direction of the longitudinal axis;

an optical fiber mounted on the support for movement in a direction transverse of the longitudinal axis;

a first interferometer mounted on the support for the reciprocation therewith, the first interferometer including a source for a first laser beam, the first interferometer directing the first laser beam to a location in an optical fiber;

an objective lens for focusing interference at the location within the optical strand to a far field;

a second interferometer including a source for a second laser beam, the second interferometer being fixed with respect to the rail, but having a pair of angularly adjustable mirrors for determining the angle at which the objective and reference beams of the second beam intersect the optical fiber;

a linear drive for moving the support wherein the optical fiber is always positioned so that the reference and object beams of the second laser beam intersect in the fiber optic;

a photodiode array positioned at the far field and being movable, transverse to the longitudinal axis, the photodiode array including a first photodiode sensitive to the wavelength of the first interferometer and a second photodiode sensitive to the wavelength of the second interferometer; and a frequency counter for determining the ratio of interference lines in the first interference pattern to the number of interference lines in the second interference pattern whereby the actual wavelength spacing for the first laser beam can be established and the interference patterns for the second laser beam can be determined for arbitrary fringe spacings.

20. The wave meter of claim 19, wherein the first laser beam is generated by a visible or infrared diode laser and the second laser beam is generated by an ultraviolet laser.

21. The wave meter of claim 19, wherein the optical fiber is coiled on a first spool mounted on the support for advancement through a vacuum chuck for coiling on a second spool mounted on the support.

* * * * *